Nov. 6, 1934.                G. H. WEBER                1,980,123
                               SHEAVE
                         Filed March 31, 1932
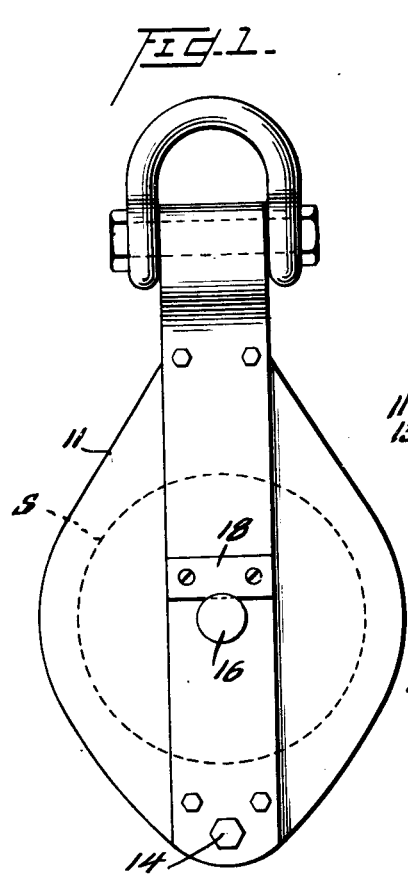
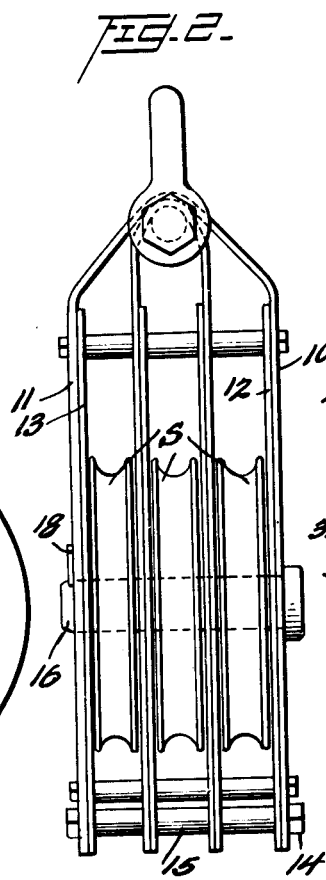
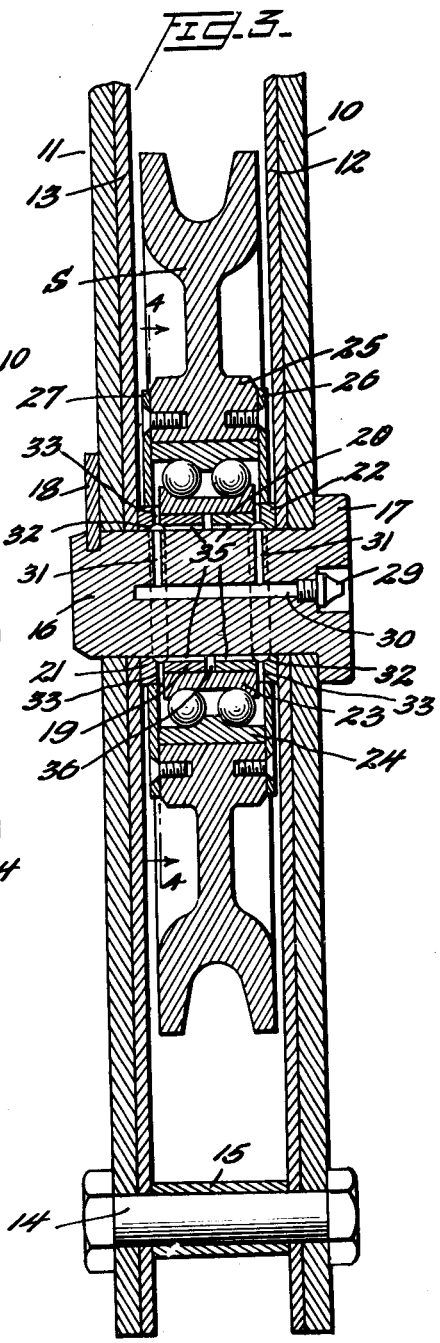
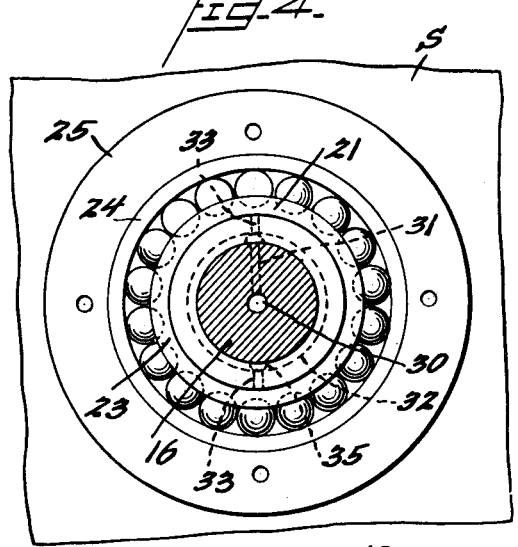
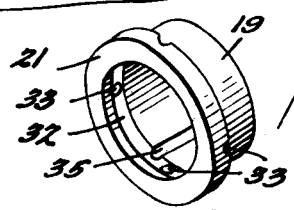
Inventor
G. H. Weber Patented Nov. 6, 1934

1,980,123

UNITED STATES PATENT OFFICE 1,980,123

SHEAVE

George Hunt Weber, New York, N. Y.

Application March 31, 1932, Serial No. 602,347

4 Claims. (Cl. 308—187)

The present invention relates to sheave constructions and particularly to sheaves of the heavy duty type designed for use in elevating heavy objects, such as, for instance, metallic structural members, in the erection of large buildings.

In accordance with the present invention, a sheave construction is provided which includes an anti-friction bearing of the ball or roller type, thus reducing greatly the frictional losses incident to rotation of the sheave on the stationary supporting pin or axle.

The invention also contemplates the provision, in a sheave construction of the ball or roller bearing type, of an auxiliary bearing member which is called into action when, and only when, failure of a ball or roller occurs or where, for some other reason, the inner and outer races of the bearing bind together and tend to rotate as one unit. It will be appreciated that the failure of a ball or roller in a sheave construction which is in actual use in the elevation of a heavy member to a great height would ordinarily be an accident of a serious nature, the sheave being thereby practically locked to the supporting pin or axle so that it would be an extremely difficult matter to either elevate or lower the object suspended in mid-air. In accordance with my present invention, I provide a novel support for the inner race of the anti-friction bearing which in itself is an anti-friction member and is called into operation upon failure of a ball or roller bearing, permitting rotation of the sheave upon its supporting pin so that the operation of raising or lowering a heavy weight may be carried to conclusion without delay or difficulty.

The invention also contemplates a novel construction and arrangement of the component elements of the sheave whereby convenience of manufacture is facilitated and cost reduced.

Again, the invention contemplates a sheave construction of considerable flexibility, not only permitting the easy manufacture of light-weight heavy-duty sheaves in the first instance but permitting the ready alteration of sheaves now in use so that the friction losses may be decreased by the incorporation of anti-friction bearings while the danger of failure of the parts is not only not increased but, on the other hand, is decreased.

Finally, by utilizing the present invention, it is possible to construct and reconstruct sheaves which vary in width and diameter simply by re-dimensioning of one or two of the essential parts, thus enabling the manufacturer to provide a series of sheaves of different capacities and dimensions from a minimum of elements and permitting the reconstruction of a sheave, having, for instance, a pin diameter of one size, so that the pin diameter is of a different size without changing the anti-friction bearing or the size of the sheave or pulley wheel itself.

The invention may have various embodiments, one of which is disclosed in the accompanying drawing, in which:

Figure 1 is an end elevation of a preferred form of sheave block in accordance with the invention;

Figure 2 is a side elevation of the same, the block illustrated having three sheaves;

Figure 3 is a vertical sectional view through a sheave block having a single sheave;

Figure 4 is a section on line 4—4 of Figure 3; and

Figure 5 is a perspective view of one of the bushing members of the sheave construction.

Referring particularly to Figure 3, it will be seen that the frame of the sheave comprises essentially parallel outer side plates 10 and 11 respectively and parallel inner side plates 12 and 13 respectively, these plates being maintained in suitable spaced relationship by means of bolts such as indicated at 14 and spacing sleeves 15. Mounted in aligned circular apertures formed in the plates is a pin 16, this pin having a head 17 on one side of one outer side plate and projecting beyond the side of the opposite side plate which is provided with an aperture to receive a keeper 18 by means of which the pin is maintained in this position.

Encircling the pin is a bushing means comprising two bushing members 19 and 20 respectively, each of these bushing members being cylindrical in shape and the outer end of bushing member 19 being provided with an annular flange 21 and the outer end of bushing member 20 with a similar flange 22. The outer annular surfaces of these flanges contact with the inner surfaces of the side plates 12 and 13, and the annular inner ends of these members are spaced apart a short distance as shown. The cylindrical surface of the aligned bushing members intermediate the flanges 20 and 21 constitutes a seating surface for the inner race 23 of an anti-friction bearing which may be of the ball or roller type, the outer race of this bearing being indicated at 24. Supported upon the outer bearing race 24 is the hub 25 of the sheave S. Fixed to the sides of the sheave are annular side plates 26 and 27 respectively, these side plates enclosing between them the anti-friction bearing and the inner edge surfaces of the plates lying in close proximity to the cylindrical outer surfaces of the flanges 21 and 22 of the bushing members.

As shown clearly in Figures 3 and 4, the pin 16 is provided with an axial duct 30, one end of which is closed by the check valve fitting 29 which is accessible from the outer end of the pin. Leading from duct 30 are two parallel ducts 31 which extend radially to the cylindrical surface of the pin, and which ducts register with annular ducts or grooves 32 formed in the inner surfaces of the bushing members and extending circumferentially thereof.

Each bushing member has furthermore provided therein four radial ducts 33, the inner ends of which communicate with annular ducts 32 and the outer ends of which open into the space between the annular ends of the inner bearing race 23 and the adjacent inner surfaces of the side plates 26 and 27 respectively. Each bushing member is also provided with two longitudinal ducts formed in its inner wall, these ducts being indicated at 35 and extending to the central gap between the annular ends of the bushing members, which gap is indicated at 36. By the system of ducts just described, lubricant may be conveniently introduced into the space between the inner and outer ball races, thus thoroughly lubricating the anti-friction bearing, and lubricant is also distributed over a limited surface of the pin 16. Any excess lubricant forced into duct 30 will make its escape through the slight gaps between the inner edges of side plates 26 and 27 and the cylindrical outer surfaces of flanges 21 and 22, thus moving through this space in a direction opposite to that which must be followed by dirt particles which tend to enter the anti-friction bearing. Occasional application of lubricant under pressure, therefore, will remove any dirt particles which may have tended to enter into the bearing.

The bushing members 19 and 20 are fabricated of some anti-friction metal, preferably bronze, and are forced into the positions in which they are shown in the drawing, the diameters of the cylindrical outer surfaces of these members being coextensive or even slightly greater than the diameter of the inner cylindrical surface of the inner race 23 so that there is a very tight frictional engagement between the bushing members and the inner race after the assembling operation has been completed. In other words, the bushing members and inner race are assembled by what is known as the "forced fit" method, and hence the bushing means and inner race of the completed sheave tend to rotate together at all times, or to remain stationary.

In the normal operation of the sheave construction, the sheave 25 rotates freely on the anti-friction bearing, and there is a minimum of frictional loss. Should the two races of the anti-friction bearing bind together for any reason, however, as, for instance, may occur due to failure of a ball or roller, the bushing means comprising bushing members 19 and 20 will then be connected to the sheave S and will rotate on pin 16. The lubricant supplied to the surface of the pin through ducts 35 will facilitate this rotation, and the sheave may be operated in this manner until such time as it may be removed and the anti-friction bearing repaired.

Normally the sheave cannot touch the side plates 12 and 13. The only parts of the sheave assembly that can touch these two plates are the flanges 21 and 22. In case of failure of the ball or roller bearing, this spacing feature is still in effect, and the side wear is then taken by the flanges 21 and 22 and by no other part of the sheave assembly.

By varying the width of the flanges 21 and 22 and the wall of the bushing members 19 and 20, the adaptability of this sheave to replace present sheaves is materially aided. The width of flanges 21 and 22 can be varied from an absolute minimum consistent with good design to almost any maximum. The bushing members 19 and 20 can be varied for a given size bearing 23 (inner race) from an absolute minimum wall thickness of bushing consistent with good design to a desired thickness to suit a definite size pin.

Having thus described the invention, what is claimed as new and desired to be secured by Letters Patent is:—

1. In a heavy duty sheave construction, in combination, a frame, a pin supported on the frame and having a duct formed therein for transmission of a lubricant, said duct having a discharge orifice formed in the cylindrical surface thereof, cylindrical bushing means of anti-friction metal encircling the pin and normally stationary with respect thereto, said bushing means having a groove for lubricant formed in the inner wall thereof and in register with the lubricant duct discharge orifice of the pin, an anti-friction bearing encircling the bushing means, and a sheave mounted on the outer race of said bearing.

2. In a heavy duty sheave construction, in combination, a frame comprising parallel side members, a pin mounted in aligned apertures formed in said members, an anti-friction bearing encircling the pin and having inner and outer races, two cylindrical bushing members of anti-friction material encircling the pin and closely engaging the inner surface of the inner bearing race, a sheave secured to the outer bearing race, and conduits in the pin and bushing members for conducting lubricant to the surface of the pin and the anti-friction bearing.

3. In a heavy duty sheave construction, in combination, a frame comprising parallel side members, a cylindrical pin mounted in aligned apertures formed in said members respectively, an anti-friction bearing encircling the pin and having substantially cylindrical inner and outer races, a bushing of anti-friction material also encircling the pin and closely engaging the outer surface thereof and the inner surface of the inner race of the anti-friction bearing, said bushing comprising two similar cylindrical members, each having an external annular flange at its outer end, said flanges being seated, respectively, against the outer annular end surfaces of the inner ball race and the inner ball race encircling and overlying the mutually facing ends of said bushing members, a sheave secured to the outer bearing race, and separately formed annular sealing elements for substantially closing the otherwise open ends of the space between the cylindrical races of the anti-friction bearing.

4. In a heavy duty sheave construction, in combination, a frame comprising parallel side members, a cylindrical pin extending transversely between said side members, an anti-friction bearing encircling the pin and having substantially cylindrical inner and outer races, a bushing of anti-friction material also encircling the pin and closely engaging the outer surface thereof and the inner surface of the inner race of the anti-friction bearing, said bushing comprising two similar cylindrical members in axial alignment, neither of which is positively connected to either the pin or inner bearing race, the inner ball race resting in part on one bushing member and in part on the other such member, a sheave secured to the outer bearing race, and annular sealing elements for the ends of the anti-friction bearing.

GEORGE HUNT WEBER.